(12) United States Patent
Chen et al.

(10) Patent No.: US 8,140,543 B2
(45) Date of Patent: Mar. 20, 2012

(54) METHOD OF TOPIC SUMMARIZATION AND CONTENT ANATOMY

(75) Inventors: Chien-Chin Chen, Taipei (TW); Meng-Chang Chen, Taipei (TW)

(73) Assignee: National Taiwan University, Taipei (TW)

( * ) Notice: Subject to any disclaimer, the term of this patent is extended or adjusted under 35 U.S.C. 154(b) by 250 days.

(21) Appl. No.: 12/631,103

(22) Filed: Dec. 4, 2009

(65) Prior Publication Data

US 2010/0161612 A1 Jun. 24, 2010

(30) Foreign Application Priority Data

Dec. 18, 2008 (TW) ................. 97149338 A

(51) Int. Cl.
*G06F 7/00* (2006.01)

(52) U.S. Cl. ........................................... 707/748
(58) Field of Classification Search .................. None
See application file for complete search history.

(56) References Cited

U.S. PATENT DOCUMENTS

2004/0006736 A1 * 1/2004 Kawatani ................ 715/500
* cited by examiner

*Primary Examiner* — Truong Vo
(74) *Attorney, Agent, or Firm* — Jackson IPG PLLC; Demian K. Jackson

(57) ABSTRACT

A topic is summarized through content anatomy. The topic is summarized temporally. In an evolution graph generated through the present invention for the topic, all important events are picked up and cause-result relationships between the events are clearly shown. Hence, difficulty in understanding evolution of the topic is effectively reduced.

9 Claims, 5 Drawing Sheets

METHOD OF TOPIC SUMMARIZATION AND CONTENT ANATOMY

FIELD OF THE INVENTION

The present invention relates to topic summarization; more particularly, relates to analyzing documents related to a topic through an eigenvector-based algorithm for generating a summary and an evolution graph of the topic.

DESCRIPTION OF THE RELATED ARTS

As knowledge-based economy times come, users have difficulty in assimilating needed knowledge from overwhelming number of documents available on traditional media and the Internet. Hence, there is an urgent need for extracting useful information from those sources. A development is on summarization for understanding the documents more easily. Time can be saved by deciding whether to read the whole document after reading its summary.

A prior art is to summarize documents artificially; yet, a lot of time and work are needed. Another prior art is to use a software "Word" of Microsoft Co. Ltd. However, the summary is formed by using the first sentence of a document and is thus not precise.

In recent years, electrical news databases become an important information source for an on-line news reader. On facing the overwhelming number of news reports, users still have difficulty in reviewing a past event in a short time without a help of a flawless mechanism. Past developments on topic detection and tracking (TDT) are simply focus on detecting topics and presenting them with news title list and keywords. Although thematic topic can be summarized from an abundant amount of news documents, many news reports still have to be read to understand the storyline of the news. Hence, the prior arts do not fulfill all users' requests on actual use.

SUMMARY OF THE INVENTION

The main purpose of the present invention is to analyze documents related to a topic through an eigenvector-based algorithm for generating a summary and an evolution graph of the topic.

The second purpose of the present invention is to obtain a temporal topic summary having a good quality with a consideration of topic temporality.

The third purpose of the present invention is to faster select representative sentences, paragraphs or documents for a topic while a compression ratio of summary is higher.

The third purpose of the present invention is to obtain an evolution graph showing important events in the topic and indicating cause-result relationships between the events for reducing difficulty in understanding an evolution of the topic.

To achieve the above purposes, the present invention is a method of topic summarization and content anatomy, comprising steps of: (a) decomposing documents related to a topic into a non-overlapping sequence of blocks and describing a theme-identifying problem with said blocks through a constraint optimization method to find and express themes as eigenvectors of a matrix; (b) analyzing changes in the eigenvectors through an R-S endpoint detection algorithm to detect events of each theme and obtain summarizations of the events; and (c) calculating context similarities of all of the events to obtain a temporal closeness per two events, and so forth, to form an evolution graph of the topic by associating all events according to the temporal closeness. Accordingly, a novel method of topic summarization and content anatomy is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
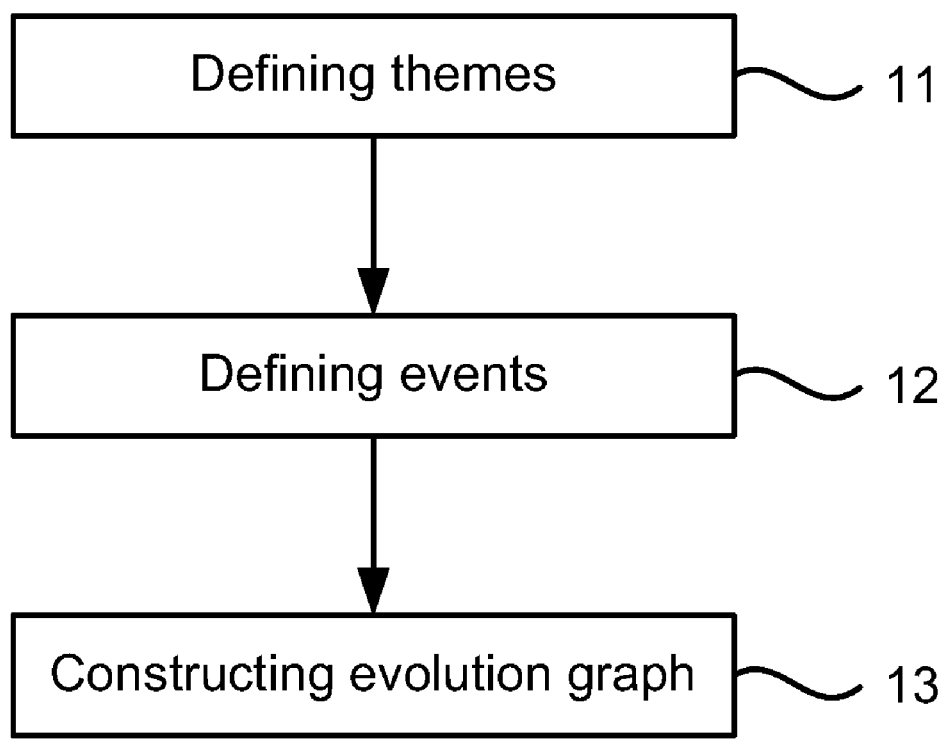
FIG. 1 is the flow view showing the preferred embodiment according to the present invention.
Figure 2:
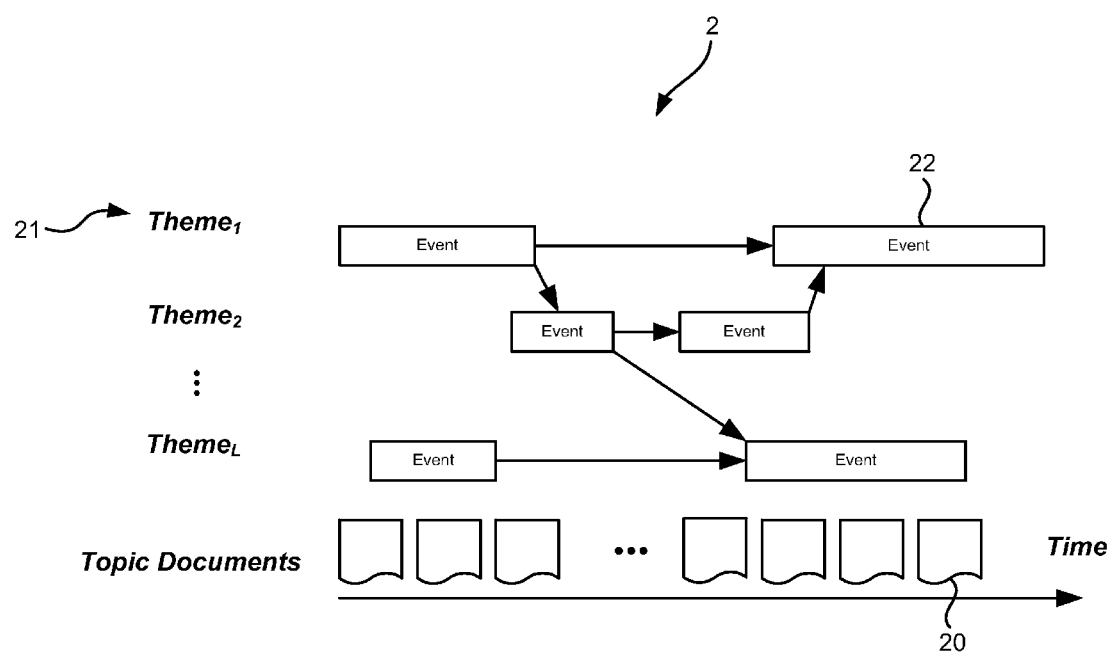
FIG. 2 is the view showing the evolution of the topic.

Please refer to FIG. 1 and FIG. 2, which are a flow view showing a preferred embodiment according to the present invention; and a view showing evolution of a topic. As shown in the figures, the present invention is a method of topic summarization and content anatomy, comprising the following steps:

(a) Defining themes 11: A topic is divided into a plurality of non-overlapping blocks 20 to be basic units for topic summarization. A theme-identifying problem is described with the blocks 20 through a constraint optimization method to find and express a plurality of themes 21 to form a matrix comprising a plurality of eigenvectors.

(b) Defining events 12: Changes in the eigenvectors are analyzed through an R-S endpoint detection algorithm to detect a plurality of temporal events 22 of each theme 21 and obtain summary of the events.

(c) Constructing evolution graph 13: A plurality of context similarities of all of the events 22 is calculated to obtain a temporal closeness per two of the events 22, and so forth, to form an evolution graph 2 of the topic by associating all of the events 22 according to the temporal closeness of each of the events.

The block 20 is a sentence, a paragraph or a whole document, whose summary has a detail determined by its size.

On using the present invention, a topic is divided into a plurality of non-overlapping blocks to be expressed as a m×n term-block association matrix B, where a vector $b_j$ in the matrix B is a keyword vector of a block. On constructing the matrix B, blocks are indexed temporally. If i<j, block $b_i$ is published before block $b_j$. Hence, after a matrix multiplication, an inter-block association matrix A is obtained through $B^T B$, where the matrix A is a symmetric matrix; and unit $a_{i,j}$ in the matrix A is an inner product of block i and block j to express a content relationship between the two blocks I,j.

If the matrix A has a rank r, an expansion is obtained through a diagonalization theorem as follows:

$$A = VDV^{-1} = VDV^T = d_{1,1} v_1 v_1^T + \ldots + d_{r,r} v_r v_r^T + 0 v_{r+1} v_{r+1}^T + \ldots + 0 v_n v_n^T$$

Therein, vector $v_i$ is an eigenvector of matrix A and $d_{i,i}$ is its corresponding eigenvalue. Here, the eigenvector $v_i$ of each line is treated as a theme of the topic; and every component in $v_i$ represents a relationship of a block to the theme. Since eigenvectors of a symmetric matrix are orthogonal, the themes represented by the eigenvectors have big variations and are considered independent. Hence, an eigenvalue of each eigenvector determines a relationship weight of a block to a theme; and, thus, a theme in a topic is selected as a summary of the topic.

After the themes are found, the eigenvectors are treated as speech signals to be processed through an R-S endpoint detection algorithm for obtaining blocks having strong and continuous eigenvectors to be events in the theme; and the block having the highest weight is regarded as a summary of the event.

Then, a context similarity of the event is calculated, where a keyword vector is obtained for the context similarity of the event $e_x$ through the following formula:

$$e_x \cdot cv = \frac{1}{1 + e_x \cdot eb - e_x \cdot bb} \sum_{i=e_x \cdot bb}^{e_x \cdot eb} |v_{i,e_x \cdot ev}| * \underline{b}_i,.$$

Therein, $e_x.bb$ and $e_x.eb$ are indexes of beginning and ending blocks of the event $e_x$ and v is a weight of a block in the theme; and, a keyword vector of the event is a combination of the keyword vectors of its blocks. A context similarity for two events is expressed as a cosine value of their keyword vectors. Then, a temporal closeness of the two events is calculated with the context similarity coordinated with a temporal weight through the following formula:

$$TW(e_i, e_j) = \begin{cases} 1 - \frac{e_j \cdot bb - e_i \cdot eb}{n}, & \text{if } e_j \cdot bb > e_i \cdot eb, \\ 1 - \frac{2*(\min(e_i \cdot eb, e_j \cdot eb) - e_j \cdot bb)}{(e_i \cdot eb - e_i \cdot bb) + (e_j \cdot eb - e_j \cdot bb)}, & \text{if } e_j \cdot bb \le e_i \cdot eb.. \end{cases}$$

According to the formula, the temporal weight is obtained based on a temporal relationship, such as non-overlapping, partial overlapping or complete overlapping, of the two events. If a temporal closeness of two events are bigger than a threshold, the two events are considered related to the topic for further obtaining an evolution graph of the topic.

Figure 3:
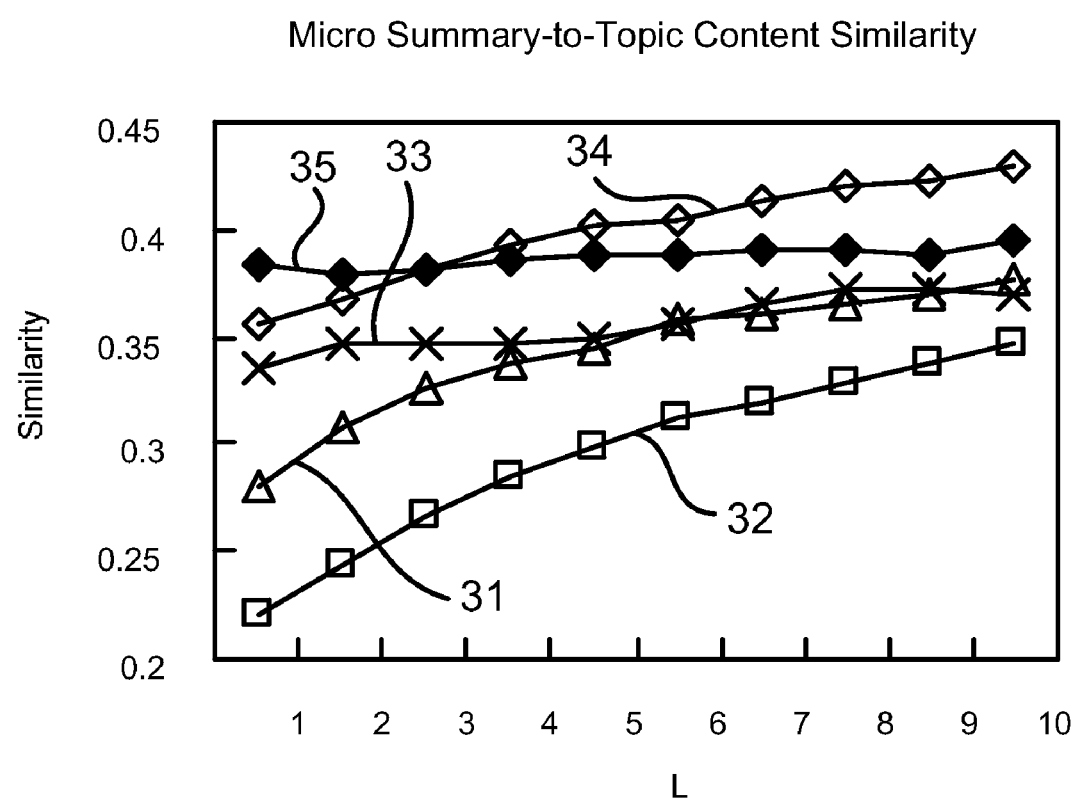
FIG. 3 is the view showing the comparison of content similarity.
Figure 4:
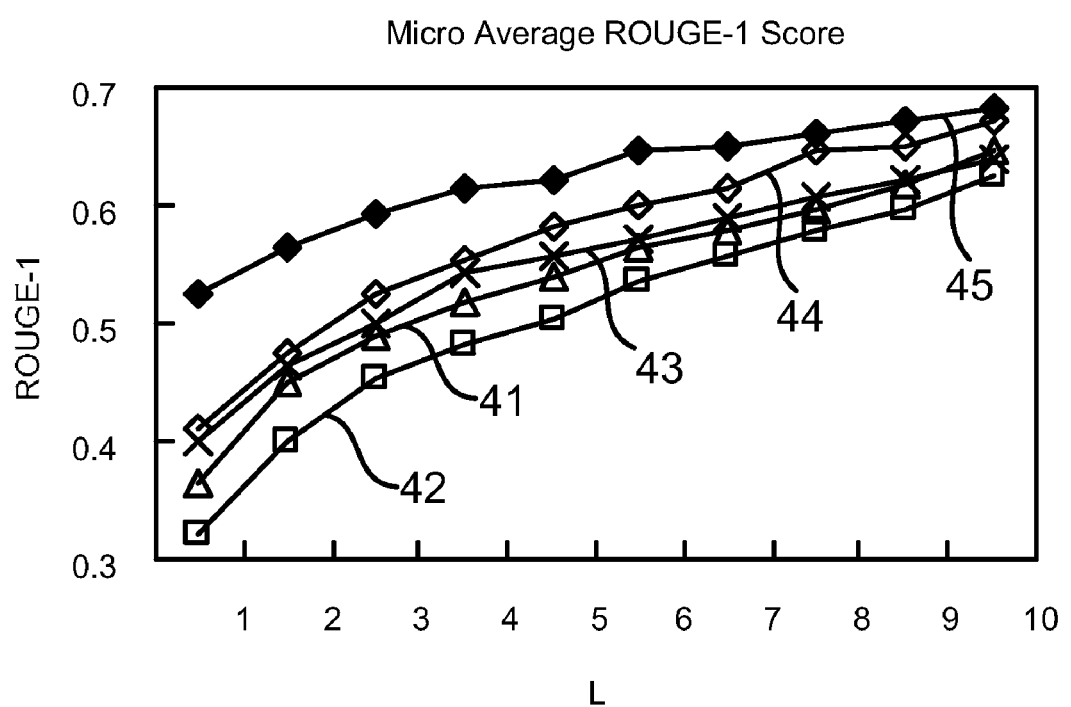
FIG. 4 is the view showing the comparison of ROUGE-1.
Figure 5:
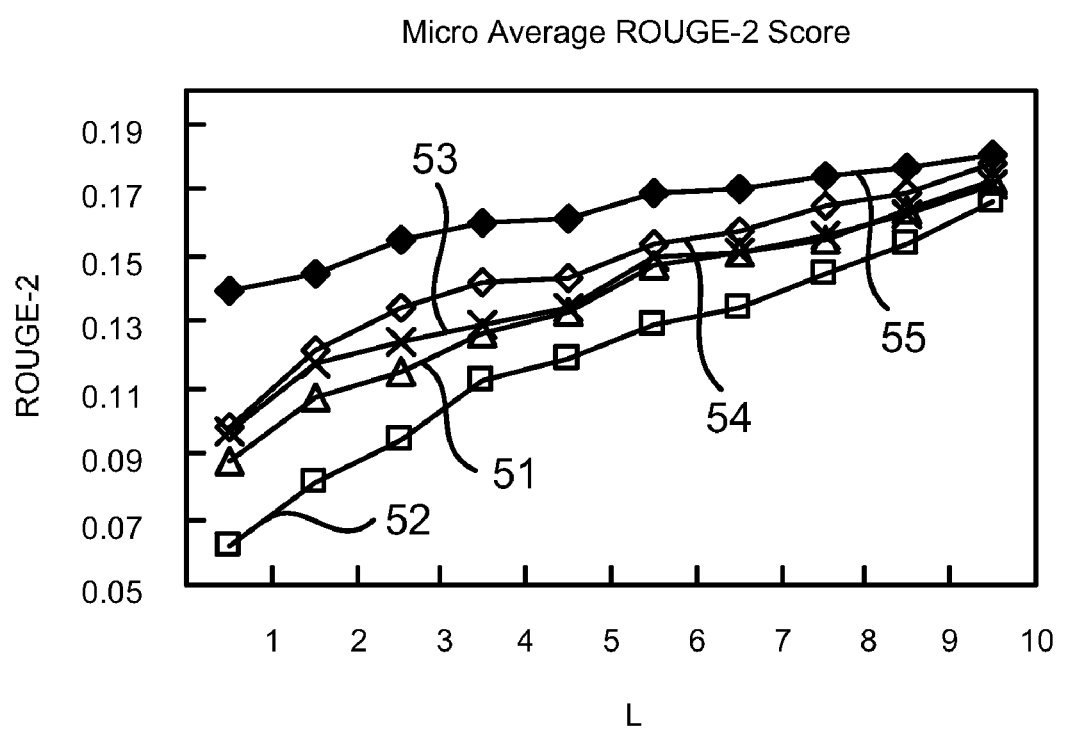
FIG. 5 is the view showing the comparison of ROUGE-2.

Please refer to FIG. 3 to FIG. 5, which are views showing comparisons of content similarity, ROUGE-1 and ROUGE-2. As shown in the figures, twenty six topics, which contain many news documents, in TDT4 are selected to be processed through the present invention for comparing performance on ROUGE-1/2 and a summary-to-topic content similarity with performances processed through other summarization methods. Comparison values are located between 0 and 1, where a bigger value indicates a summary having a better quality. Therein, a forward method and a backward method are two of those summarization methods, which are simple summarization methods and extract the beginning and ending parts to form the summaries. In addition, an SVD-based summarization method and a K-means summarization method are selected for comparison. Therein, the horizontal axis indicates size of summary and a bigger value of L means that a summary has more content.

In FIG. 3, a similarity curve of the forward method 31, a similarity curve of the backward method 32, a similarity curve of the SVD-based summarization method 33, a similarity curve of the K-means summarization method 34 and a similarity curve of the present invention 35 are shown. As a comparison result shows, the present invention has a lower performance than the K-means summarization method on big summaries. However, without an effective mechanism, such as a structure of themes and events, to organize the summaries, large K values obtained by the K-means summarization method indicate that the summaries are unstructured, and therefore topic evolution is difficult to understand.

In FIG. 4 and FIG. 5, ROUGE-1/2 curves of the forward method 41,51, ROUGE-1/2 curves of the backward method 42,52, ROUGE-1/2 curves of the SVD-based summarization method 43,53, ROUGE-1/2 curves of the K-means summarization method 44,54 and ROUGE-1/2 curves of the present invention 45,55 are shown. Since ROUGE considers consistency between a content of a generated summary and that of a set of expert-composed reference summaries, the summaries generated through the present invention are found more consistent to expert-composed summaries than those of the other summarization methods.

The present invention picks up temporal events in themes and a topic summary thus generated is temporal. Hence, a temporal topic summary having a better quality is obtained with a consideration of topic temporality. Besides, while a compression ratio of summary is higher, the present invention picks up representative sentences, paragraphs or documents for the topic faster than the other summarization methods. Moreover, an evolution graph generated by the present invention shows important events in the topic and indicates cause-result relationships between the events.

To sum up, the present invention is a method of topic summarization and content anatomy, where a temporal topic summary having a good quality is obtained based on topic temporality; while a compression ratio of summary is higher, representative sentences, paragraphs or documents for a topic are selected faster; and an evolution graph shows important events in the topic and indicates cause-result relationships between the events for reducing difficulty in understanding an evolution of the topic.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of topic summarization and content anatomy, comprising steps of:
   (a) decomposing a plurality of documents related to a topic into a non-overlapping sequence of a plurality of blocks and describing a theme-identifying problem with said blocks through a constraint optimization method to find and express a plurality of themes to obtain a matrix comprising a plurality of eigenvectors;
   (b) analyzing changes in said eigenvectors through an R-S endpoint detection algorithm to detect a plurality of temporally different events of each of said themes and obtain a plurality of summaries of said temporally different events; and
   (c) calculating a context similarity of each of said temporally different events to obtain a temporal closeness per two of said temporally different events, and so forth, to form an evolution graph of said topic by associating all of said temporally different events according to said temporal closeness of each of said temporally different events;

wherein, in step (c), said context similarity of said event ⊖x is calculated to obtain a keyword vector through the following formula:

$$e_x \cdot cv = \frac{1}{1 + e_x \cdot eb - e_x \cdot bb} \sum_{i=e_x \cdot bb}^{e_x \cdot eb} |v_{i,e_x \cdot ev}| * \underline{b}_i\,;$$

wherein said temporal closeness of two of said events is calculated to obtain a temporal weigh through the following formula:

$$TW(e_i, e_j) = \begin{cases} 1\dfrac{e_j \cdot bb - e_i \cdot eb}{n}, & \text{if } e_j \cdot bb > e_i \cdot eb, \\ 1\dfrac{2*(\min(e_i \cdot eb, e_j \cdot eb) - e_j \cdot bb)}{(e_i \cdot eb - e_i \cdot bb) + (e_j \cdot eb - e_j \cdot bb)}, & \text{if } e_j \cdot bb \le e_i \cdot eb. \end{cases}$$

2. The method according to claim 1, wherein said block comprises at least one content selected from a group consisting of a sentence, a paragraph and a document.

3. The method according to claim 1, wherein an eigenvalue of said eigenvector determines a relationship weight of said block to a respective theme.

4. The method according to claim 1, wherein, in step (a), an inter-block association matrix between each two of said blocks is obtained through a matrix multiplication with said blocks of said topic.

5. The method according to claim 4, wherein said inter-block association matrix is a symmetric matrix.

6. The method according to claim 1, wherein, in step (b), temporal blocks in said eigenvectors are obtained as events in said theme through said R-S endpoint detection algorithm; and said block having a highest weigh is obtained as a summary of said event.

7. The method according to claim 1, wherein, in step (c), said context similarity of two of said events is obtained from a cosine value of said keyword vectors of said events.

8. The method according to claim 1, wherein, in step (c), a weight is obtained through a temporal weight function according to a relationship of two of said events; and two events having a values of temporal closeness larger than a threshold are regarded as related to further obtain an evolution graph of said topic.

9. The method according to claim 8, wherein said temporal closeness is selected from a group consisting of non-overlapping, partial overlapping and complete overlapping.

\* \* \* \* \*